Oct. 28, 1969    THOMAS TSINGTON YEN    3,474,778
PULSE REPETITION RATE DETERMINATION CIRCUIT
Filed June 5, 1967    2 Sheets-Sheet 1

THOMAS TSING TON YEN
INVENTOR.

KENDRICK, SUBKOW and STOLZY
BY
Philip Subkow
ATTORNEYS

Oct. 28, 1969 THOMAS TSINGTON YEN 3,474,778
PULSE REPETITION RATE DETERMINATION CIRCUIT
Filed June 5, 1967 2 Sheets-Sheet 2
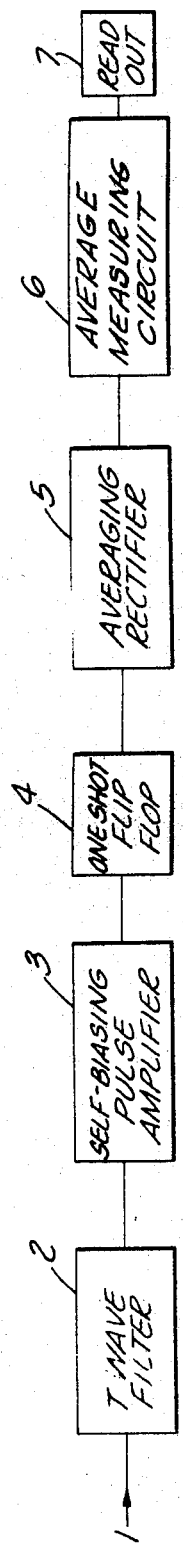
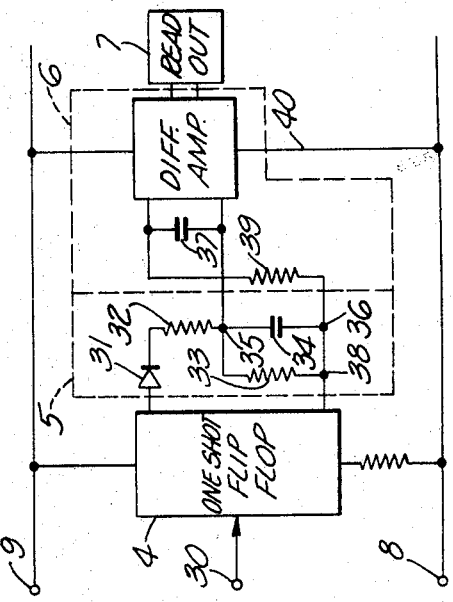
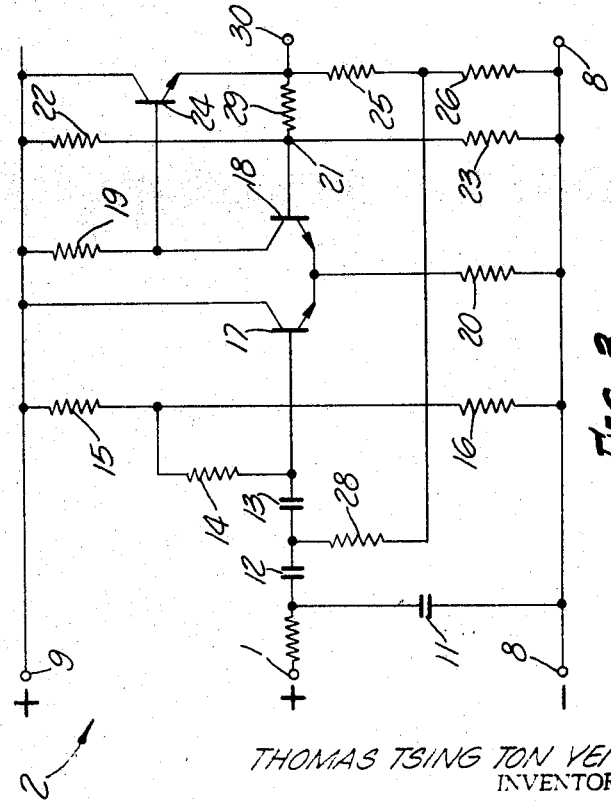
THOMAS TSING TON YEN
INVENTOR.
KENDRICK, SUBKOW and STOLZY
BY Philip Subkow
ATTORNEYS

United States Patent Office 3,474,778
Patented Oct. 28, 1969

1

3,474,778
PULSE REPETITION RATE DETERMINATION CIRCUIT
Thomas Tsington Yen, Los Angeles, Calif., assignor to Statham Instruments, Inc., Los Angeles, Calif., a corporation of California
Continuation-in-part of application Ser. No. 621,023, Mar. 6, 1967. This application June 5, 1967, Ser. No. 643,457
Int. Cl. A61b 5/02; H03f 1/00
U.S. Cl. 128—2.06  3 Claims

ABSTRACT OF THE DISCLOSURE

This disclosure relates to the measurement of the frequency of periodic pulses in a train of pulses of different frequencies and is particularly adapted for use in cardiotachometers to determine the pulse repetition rate of the R pulses in an electrocardiograph signal. The system separates and passes the isolated R pulse to an averaging rectifier and thence to an averaging measuring circuit which provides an output signal proportional to the repetition rate of the R pulses. This signal is then a measure of the heart beat rate.

---

This application is a continuation-in-part of application Ser. No. 621,023, filed Mar. 6, 1967.

The system accepts an EKG (electrocardiograph) signal of conventional character comprising a pulse train having high intrinsic frequency, high amplitude pulses (R pulses) and low intrinsic amplitude, high frequency pulses (S pulses), followed by low intrinsic frequency, low amplitude pulses (T and p pulses). The pulse train is passed through a T pulse filter where the T and p pulses are suppressed and the S pulse is rejected in substantial part. The filtered signal is amplified in a manner to further suppress T and S pulses.

The issuing R pulse triggers a single shot flip-flop which generates a standardized square wave pulse of constant amplitude and width with repetition rate proportional to the repetition rate of the R wave pulses. The standardized pulses are integrated to develop a voltage proportional to the repetition rate of the R pulses.

BRIEF DESCRIPTION OF THE DRAWINGS

This system will be further described by reference to the drawings of which:

FIG. 2 is a block diagram illustrative of the circuit of the invention;

FIG. 3 is a circuit schematic of the T-wave filter of FIGURE 2;

FIG. 4 is a circuit schematic, partially in block form, of the averaging amplifier and average measuring circuit.

DESCRIPTION OF THE PREFERRED EMBODIMENT

Figure 1:
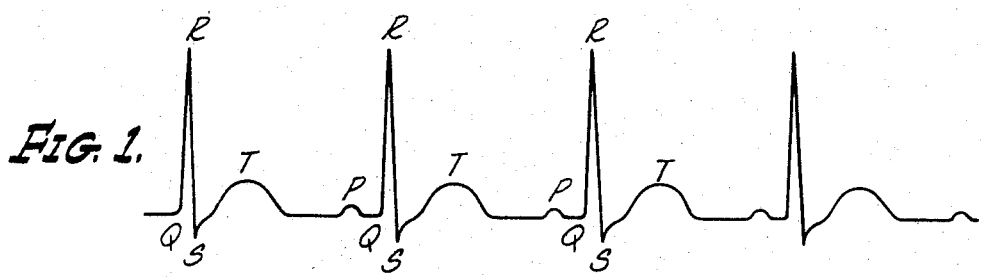
FIG. 1 is a graphical representation of an EKG signal.

FIG. 1 illustrates a representative EKG signal showing a train of R, S, T and p pulses in their normally occurring time sequence. It will be seen that although the pulse repetition rates of the different sets of pulses are substantially identical, the intrinsic frequency of each set differs significantly from that of the other sets. For example, the R pulses have an intrinsic frequency many times that of the T pulses.

2

In FIG. 2 the EKG pulse train is applied at 1 and passes through the T-wave filter 2. The resultant signal is then amplified in a self-biasing pulse amplifier 3 to a suitable condition for triggering the one-shot flip-flop 4, both of conventional design. The generally square wave signal of the flip-flop is fed to an averaging rectifier or integrating circuit 5, and output of which is acted upon by an average measuring circuit 6 which consists of a differential amplifier, capacitor 37 and resistor 39 to provide a signal to readout 7 of magnitude proportional to the output of the averaging rectifier and thus to the pulse repetition rate of the R pulses. For detailed circuital aspects of the average measuring circuit 6, reference can be made to the parent application Ser. No. 621,023 cited herein.

While the repetition rates of the R and T sets of pulses are the same, the intrinsic frequency of the R pulses is from two to three times that of the T pulses, and the amplitude of the R wave is substantially greater than that of the T and p waves. Additionally, the p wave has a frequency that is substantially less, than the R frequency. In a way that will be more explicitly set forth hereinbelow, the T wave filter acts to pass the R pulses while strongly inhibiting passage of the T pulses and, to a lesser extent, the p pulses.

It is the basic principle of operation of this invention to utilize the R wave pulse rate as a measure of the heart beat. To discriminate the R wave from the T and p waves, I have provided a filter with a very sharp cut-off. Conventional active filters, when adjusted to sharp cut-off, have been found to exhibit ringing, that is, a substantially undamped response to an input pulse. I have been able to substantially eliminate ringing by inserting a differential amplifier between the R-C network of the filter and an emitter-follower output stage of the filter 2.

In FIG. 3, the EKG signal is applied across 1 and 8 and suitable D.C. power across 8 and 9. An active filter is formed by a pair of capacitors 12 and 13, voltage dividing resistors 14, 15 and 16, a transistor connected as an emitter-follower, and output voltage dividing resistors 25 and 26, with positive feedback via resistor 28. The resistance 28 is connected at one end between capacitors 12 and 13 and at its other end between resistors 25 and 26 of the voltage divider. A differential amplifier, composed of transistors 17 and 18 in association with the voltage dividing resistors 14, 15 and 16, and also resistors 22 and 23, is introduced between the capacitor 13 and the emitter-follower 24.

The positive feedback from the emitter of transistor 24 is taken from the common connection of resistors 25 and 26 and applied through resistor 28 to the common point of capacitors 12 and 13. Resistors 15, 19 and 22 are chosen of such values as to maintain transistor 18 in saturation. The resistor 29 sets the gain of the amplifier and output is taken across 30 and 8. The circuit of FIGURE 3 has a sharp cut-off with the T, p and S pulses severely suppressed, and eliminated for all practical effect.

Figure 5:
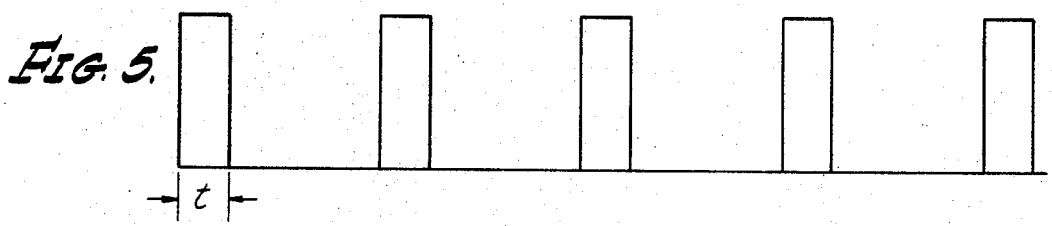
FIGS. 5 and 6 illustrate in graphic form the timed relation of certain waveforms obtained in the circuit of FIGURE 4.

The resultant filtered signal is applied to the self-biasing pulse amplifier 3. The pulse amplifier generates a sharp pulse coincident with the peak of the filtered R wave. The amplified pulse triggers the one-shot (monostable) flip-flop 4 to generate a square-wave pulse output where the spacing of the square-wave pulses is proportional to the R pulse repetition rate (cf. FIGS. 1 and 5). A flip-flop of this kind is of conventional design and detailed circuital features are therefore not provided.

The repetition rate of the R wave is relatively low, e.g., 10–300 pulses per minute. I have devised an averaging circuit 5 suitable to develop a voltage proportional to the pulse rate, which circuit is shown in FIG. 4. More particularly, the square wave output of the flip-flop 4 is converted into a sawtooth wave, depicted in FIG. 6, through the cooperative action of the diode 31, resistors 32 and 33, and capacitor 34. The square-wave pulses from the flip-flop are integrated in the capacitor 34 to establish a potential at point 35 and 36 having a magnitude proportional to the repetition rate of the square wave pulses and thus the R pulse repetition rate.

The time constant of the capacitor 34 and associated resistors is desirably many times the period of the square wave pulses, i.e., the time interval between succeeding R pulses. For example, and not as a limitation, excellent results for present purposes have been obtained with the time constant of the RC network being ten times the time interval of the longest interval of R pulses which is likely to be encountered in a living animal or man whose heart beat is to be measured.

The integral potential is taken across points 35 and 36, across which is shunted serially arranged resistor 39 and capacitor 37. The input to the average measuring circuit 6 is taken across the capacitor 37. The common terminal 40 of the differential amplifier is connected to the negative power line 8.

The output of the amplifier 6 is indicated by a suitable read-out device 7, such as a calibrated meter or recorder, for example.

Figure 6:
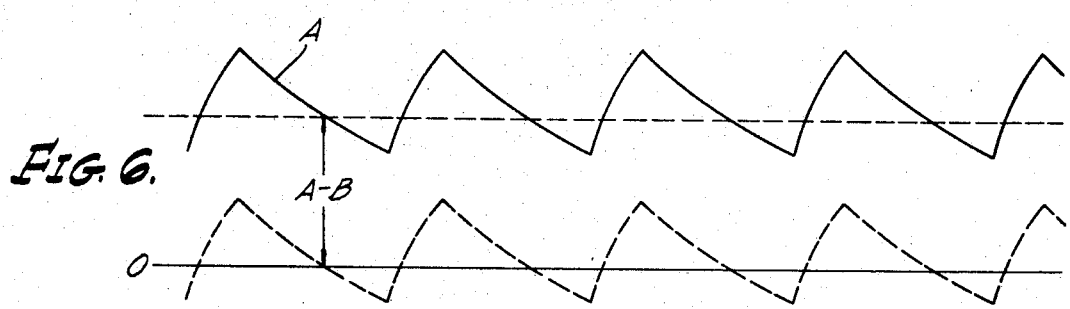

As shown best in FIGURE 6, wave A represents the instantaneous potential on the capacitor 34 and is in the form of a sawtooth wave, also including a DC component. The DC component is the measure of the rate of the R wave, i.e., the blood pulse rate. The output of the differential amplifier 6 is shown as a voltage A–B, which is the value of this DC component and thus is a voltage proportional to the blood pulse rate.

Although but one specific embodiment of the present invention has been described and illustrated herein, many changes and modifications will suggest themselves to those skilled in the art. This single embodiment has been selected for the present description for the purpose of illustration only and, therefore, the invention should not be limited to the embodiment so selected, the true scope of the invention being defined only in the appended claims.

I claim:
1. A circuit for determining the pulse repetition rate of a set of high frequency pulses in a pulse train including at least one set of lower frequency pulses, comprising:
  filtering means fed by the pulse train and having a high frequency bandpass characteristic for passing signals lying within a frequency range including that of the high frequency pulses in the pulse train, and for suppressing signals lying without the range;
  two-terminal output means responsive to the filtered high frequency pulses for generating standard pulses of repetition rate corresponding to the pulse period of the high frequency pulses in the pulse train read out means;
  integrating means connected to receive the standard pulses at its input and provide an output signal of amplitude directly proportional to the pulse repetition rate of said standard pulses to said read out means, said integrating means including a series circuit connected across the two-terminal output of the means for generating standard pulses, in the order recited, of a diode, a first resistor, and an integrating capacitor, and
  a second resistor arranged in shunt with the integrating capacitor; and
  a differential amplifier having a pair of input terminal means,
  means interconnecting the common connection point of the integrating capacitor and the first resistor with one differential amplifier input terminal means,
  a third resistor interconnecting the other differential amplifier input terminal means with the output terminal of the means for generating standard pulses to which the integrating capacitor is connected, and
  a second capacitor arranged in parallel connection with the differential amplifier input terminal means.

2. A pulse repetition rate determination circuit as in claim 1, in which the standard pulse generating means includes a monostable circuit impulsable by the filtered high frequency pulses to provide constant amplitude and width pulses, the repetition rate of which corresponds to the period of high frequency pulses in the pulse train.

3. A system for determining the pulse repetition rate of R pulses in a train of pulses provided by an EKG, which train also includes repeating sets of other lower frequency pulses T and p, comprising:
  an RC circuit of sharp cut-off characteristics connected to receive the train of pulses, readily passing pulses of a frequency in the range immediately adjacent that of the R pulses and suppressing the T and p pulses;
  pulse amplifying means connected to receive the filtered R pulses;
  monostable means having a pair of output terminals actuated by the output of the pulse amplifying means to provide a substantially constant square wave signal of pulse repetition period corresponding to that of the R pulses;
  a polarized RC integrating network fed by the square wave signal including
  a series circuit connected across the two-terminal output of the monostable means, in the order recited, of a diode, a first resistor and a first capacitor, and
  a second resistor shunting the capacitor;
  an average measuring circuit including,
  a differential amplifier having a pair of input terminal means,
  means interconnecting the common connection point of the first capacitor and the first resistor with one differential amplifier input terminal means,
  a third resistor interconnecting the other differential amplifier input terminal means with the output terminal of the monostable means to which the capacitor is connected, and
  a second capacitor arranged in parallel connection with the differential amplifier input terminal means; and
  means for presenting a read-out on the differential amplifier output.

References Cited
UNITED STATES PATENTS

| | | | |
|---|---|---|---|
| 2,439,495 | 4/1948 | Sturm | 128—2.05 |
| 2,801,629 | 8/1957 | Edmark | 128—2.05 |
| 2,815,748 | 12/1957 | Boucke | 128—2.05 |
| 3,228,391 | 1/1966 | Fitter et al. | 128—2.05 |
| 3,261,988 | 7/1966 | Johnson | 330—69 X |

WILLIAM E. KAMM, Primary Examiner